United States Patent [19]
Holt et al.

[11] Patent Number: 5,742,597
[45] Date of Patent: Apr. 21, 1998

[54] METHOD AND DEVICE FOR MULTIPOINT SWITCHING AND ARBITRATION IN OUTPUT-REQUEST PACKET SWITCH

[75] Inventors: Craig Sheppard Holt, Cohasset; Richard Kline, E. Walpole; Krishnan Ramakrishnan, Plainville, all of Mass.

[73] Assignee: Motorola, Inc., Schaumburg, Ill.

[21] Appl. No.: 616,029

[22] Filed: Mar. 14, 1996

[51] Int. Cl.[6] ............................................. H04L 12/56
[52] U.S. Cl. ............................................. 370/390; 370/414
[58] Field of Search ............................. 370/390, 395, 370/412, 413, 414, 415, 416, 417, 418, 362, 363, 364

[56] References Cited

U.S. PATENT DOCUMENTS

| | | | |
|---|---|---|---|
| 4,623,996 | 11/1986 | McMillen | 370/418 |
| 4,814,762 | 3/1989 | Faranszek | 340/825.79 |
| 4,939,720 | 7/1990 | Bakka | 370/417 |
| 5,001,706 | 3/1991 | Dghe et al. | 370/422 |
| 5,301,055 | 4/1994 | Bagchi et al. | 370/395 |
| 5,305,311 | 4/1994 | Lyles | 370/390 |
| 5,577,035 | 11/1996 | Hayter et al. | 370/412 |

OTHER PUBLICATIONS

ATM "User–Network Interface Specification", Version 3.0, Fred Sammartino.
The ATM Forum Newsletter, Oct., 1995 vol. 3, Issue 4 "53 Bytes".
The ATM Forum, Technical Committee, "Traffic Management Specifications", Version 4.0, Feb. 1996.

*Primary Examiner*—Hassan Kizou
*Attorney, Agent, or Firm*—Darleen J. Stockley

[57] ABSTRACT

A method and device are provided for efficient switching of multipoint packets in an output request packet switch, the multipoint packets being switched from a plurality of input ports to a plurality of egress ports where at least one packet is to be delivered to at least two destination egress ports.

22 Claims, 10 Drawing Sheets

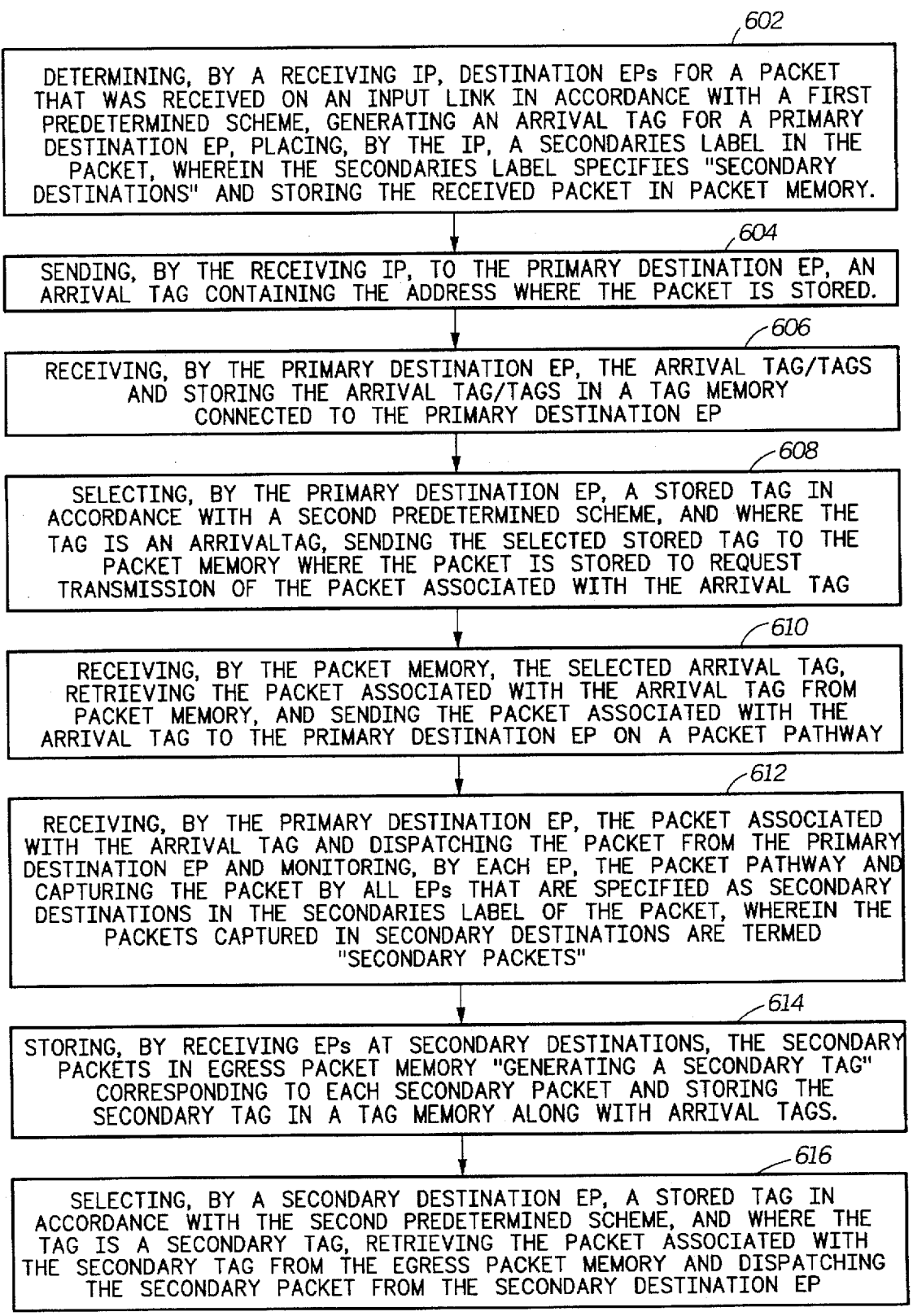
FIG. 6    600

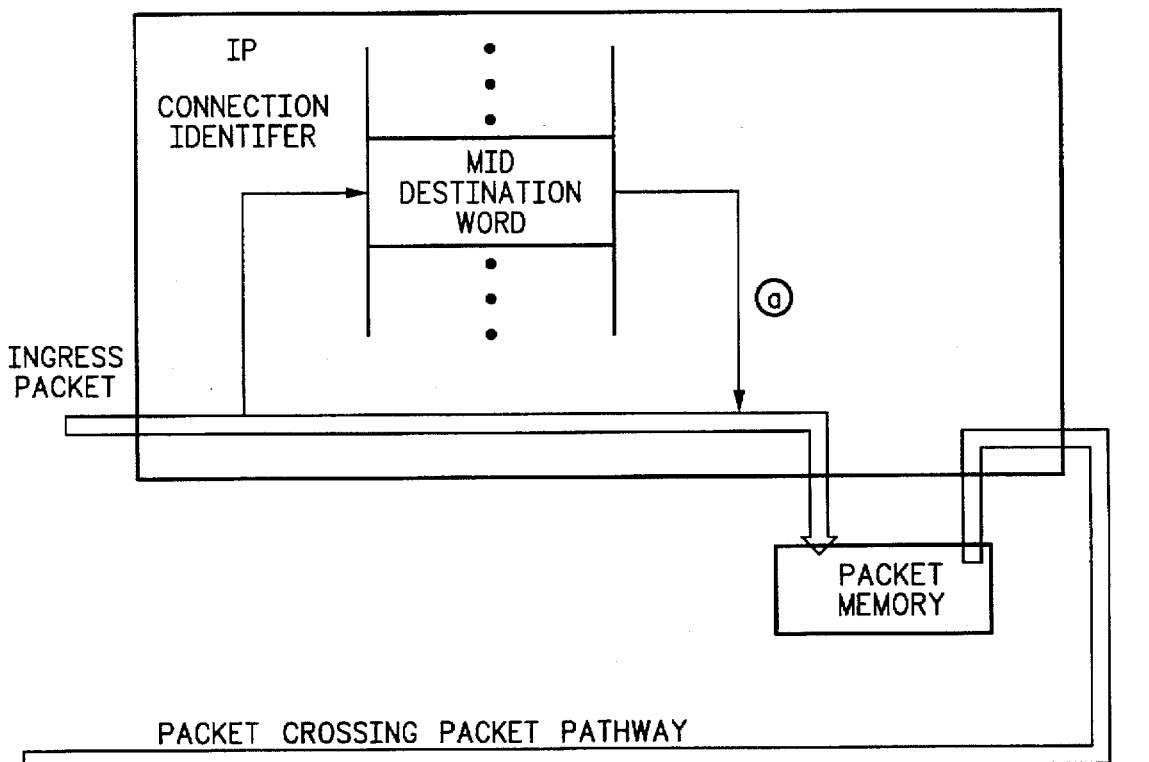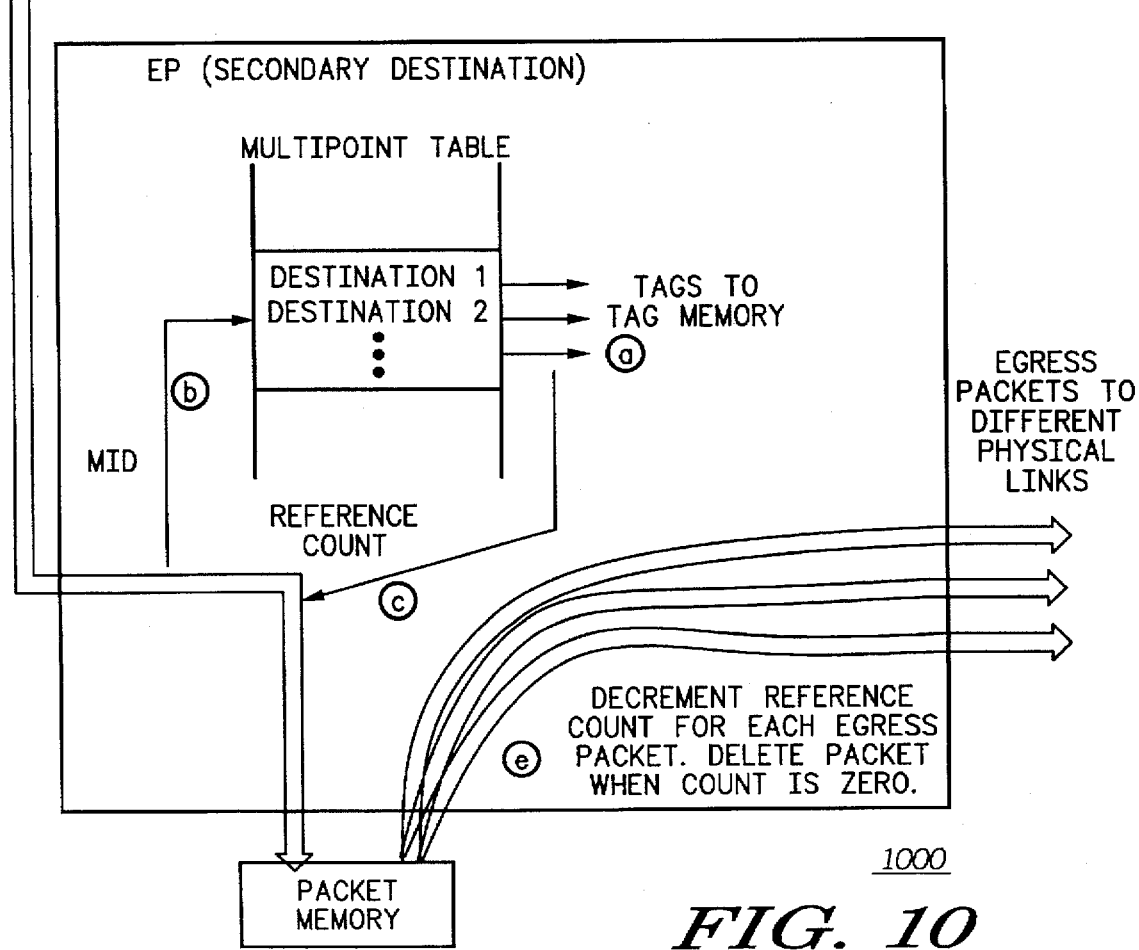
FIG. 10

METHOD AND DEVICE FOR MULTIPOINT SWITCHING AND ARBITRATION IN OUTPUT-REQUEST PACKET SWITCH

The present application may be related to co-pending applications that are being filed concurrently: U.S. patent application Ser. No. 08/616,024, EFFICIENT OUTPUT-REQUEST PACKET SWITCH AND METHOD, by Craig Sheppard Holt, Richard Kline, and Krishnan Ramakrishnan; and U.S. patent application Ser. No. 08/616,147, EVENT-DRIVEN PACKET SCHEDULER AND METHOD FOR SUPPORTING MULTIPLE SERVICE CATEGORIES IN AN ATM NETWORK, by Richard B. Kline.

FIELD OF THE INVENTION

The present invention relates generally to packet communication networks for transmitting a digitally coded packet, and more particularly, to efficient point-to-multipoint packet switching in a packet communication network.

BACKGROUND OF THE INVENTION

Packet switching is a technology for networking systems in which data from a plurality of users is divided into units called packets and transmitted over a common transmission line. Packet switching differs from circuit switching in that packet switching uses bandwidth allocated dynamically on demand across logical connections, as opposed to the long-term allocations of bandwidth provided in circuit switching. Packet switching can reduce costs to network users by providing better sharing of network resources than circuit switching. Packet switched service has the capability to handle any mixture of traffic types, such as voice, video, and data, simultaneously. It can also provide different classes of service, in terms of delay, jitter and probability of loss, to different connections.

Packet communication networks consists of "nodes" which are devices for creating, accepting, or transferring packets, and "links" that connect two nodes. In a packet communication network, packet messages are digitally encoded at a source node for transmission over some sequence of links and nodes to a destination node of the network. In a given transmission path, there generally are one or more intermediate nodes or "switches," where each switch connects multiple source and destination links.

FIG. 1, numeral 100, shows an abstract representation of a switch connecting N input links and N output links, each of rate R. The maximum throughput of the entire switch is less than or equal to N*R (102), (where "*" denotes multiplication). For each packet that arrives on an input link, the output link selected is dependent upon information contained in a preselected location within the packet. Three classes of packet switch designs known in the art are output-queued switches, input-queued switches, and shared-memory switches.

FIG. 2, numeral 200, is a block diagram showing packet flows in a typical output-queued switch architecture as is known in the art. The processing performed on each packet by the switch has two parts: ingress processing in an ingress port (IP) (202, 204, 206, ... 208), and egress processing in an egress port (EP) (226, 228, 230, ..., 232). Packets arrive at IPs and are directed to a selected EP through a switch fabric (234) capable, for example, of delivering all arriving packets (rate N*R). FIG. 2 shows, for example, a shared-media switch fabric, though other types are possible (e.g., crosspoint, banyan). Address filters (210, 212, 214, ..., 216) select the packets that are addressed to a particular EP. The selected packets are stored in, for example, first-in-first-out (FIFO) buffers (218, 220, 222, ..., 224), and then sent to egress ports (226, 228, 230, ..., 232).

In the output-queued switch, all packets arriving at IPs are transferred in a fixed amount of time to the output FIFOs. Note, however, that multiple packets may be directed to the same egress port at the same time, as shown in FIG. 3. It is this bursty nature of packet deliveries that creates the need for the FIFOs. If there are N switch inputs at rate R to IPs (302, 304, 306, ..., 308) across a switch fabric (334), then the FIFOs (318, 320, 322, ... 324) receiving an output from one of a plurality of address filters (310, 312, 314, ... 316) must be designed to accept packets at rate N*R, while packets are read out of FIFOs (326, 328, 330, ... 332) at rate R. For large switches, these FIFOs require the use of large, very high speed memories.

FIG. 4, numeral 400, is a block diagram of a device having packet flows in a typical input-queued architecture as is known in the art. As in the output-queued case, there are IPs (402, 404, 406, ..., 408), EPs (426, 428, 430, ... 432), FIFOs (410, 412, 414, ..., 416) and a switch fabric (e.g., shared-media fabric 434 with rate N*R). However, in an input-queued switch, each EP can accept only one packet at a time. When multiple IPs have a packet to deliver to the same EP, the arbitration blocks (418, 420, 422, ..., 424) allow only one packet to be delivered; the rest are delayed or "blocked." The FIFOs are used to store the delayed packets. This "head-of-line blocking" behavior causes significantly lower performance than the performance of output-queued switches. The FIFOs, however, are only required to read and write data at rate R.

Delivering a packet from a single input link to a single egress link is termed point-to-point switching. In a packet switch there may also be a need for multipoint switching, that is, delivering a packet from an input link to multiple output links. A packet that has multiple destinations is referred to as a multipoint packet. Typical applications for multipoint switching are: LAN (Local Area Network) emulation, conference calls, and broadcast video and multimedia.

Each packet typically consists of a "header" containing information used to route the packet to its destination, followed by a "payload" of data. Multipoint switching requires the packet payload to be replicated within the switch, while a new packet header typically must be generated uniquely for each destination.

Ideally, the delays in delivering copies of a multipoint packet to multiple destinations should be governed by the congestion and packet priorities at each destination, and independent of congestion at other destinations.

In a typical packet switch, consisting of ingress (502, 504, ...) and egress (506, 508, ...) processing blocks connected by a switch fabric (510) (see FIG. 5, numeral 500), there are various possibilities for implementing packet replication for multipoint switching.

One possibility is to replicate packets upon arrival at an IP and store the multiple copies in an input buffer. Then these individual copies can be delivered as point-to-point packets. This method requires extra memory space for storing the replicated packets. Also, since multiple copies must traverse the switch fabric, additional switch fabric throughput may be required.

A second possibility is to store only one copy of the multipoint packet at the IP, and send this packet multiple times across the switch fabric to the various EPs that are destinations for the packet. This again requires high throughput in the switch fabric, to accommodate the multiple copies of the multipoint packets.

A third possibility is to use a switch fabric that can simultaneously deliver the packet to multiple EPs. This method is well-suited to output-queued switches, but in other architectures it may be difficult to determine when to send the packet, since a delay that is suitable for one EP may not be suitable for another.

Hence there is a need for a method and packet switch for efficient multipoint switching.

BRIEF DESCRIPTION OF THE DRAWINGS

FIG. 6 is a flow chart of step of a preferred embodiment of a method in accordance with the present invention.

FIG. 10 is a block diagram representation showing delivery of packets to multiple physical destinations on a same switch port.

DETAILED DESCRIPTION OF A PREFERRED EMBODIMENT

Figure 1:
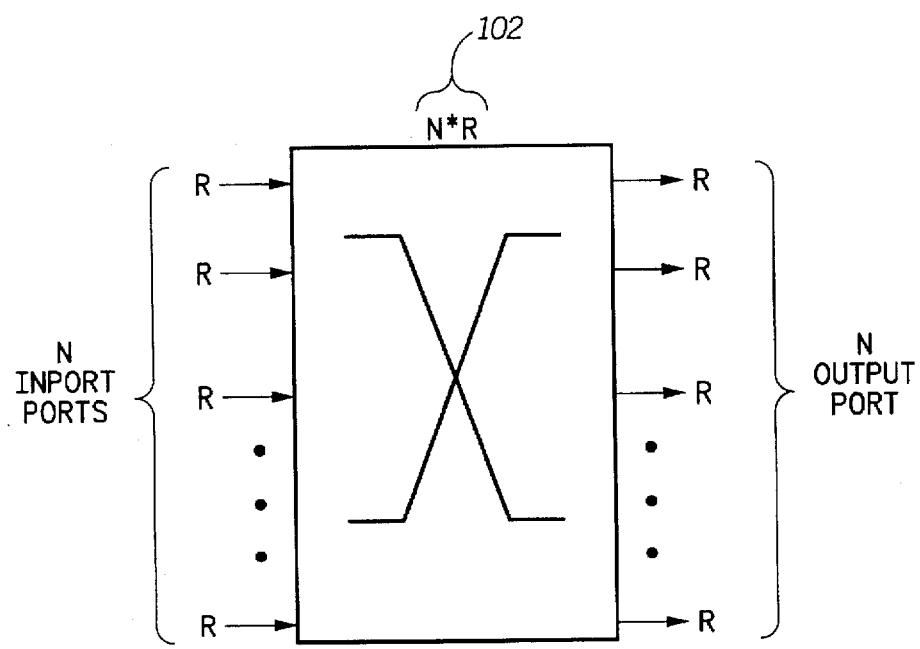
FIG. 1 shows an abstract representation of a switch connecting N input links and N output links, each of rate R.
Figure 5:
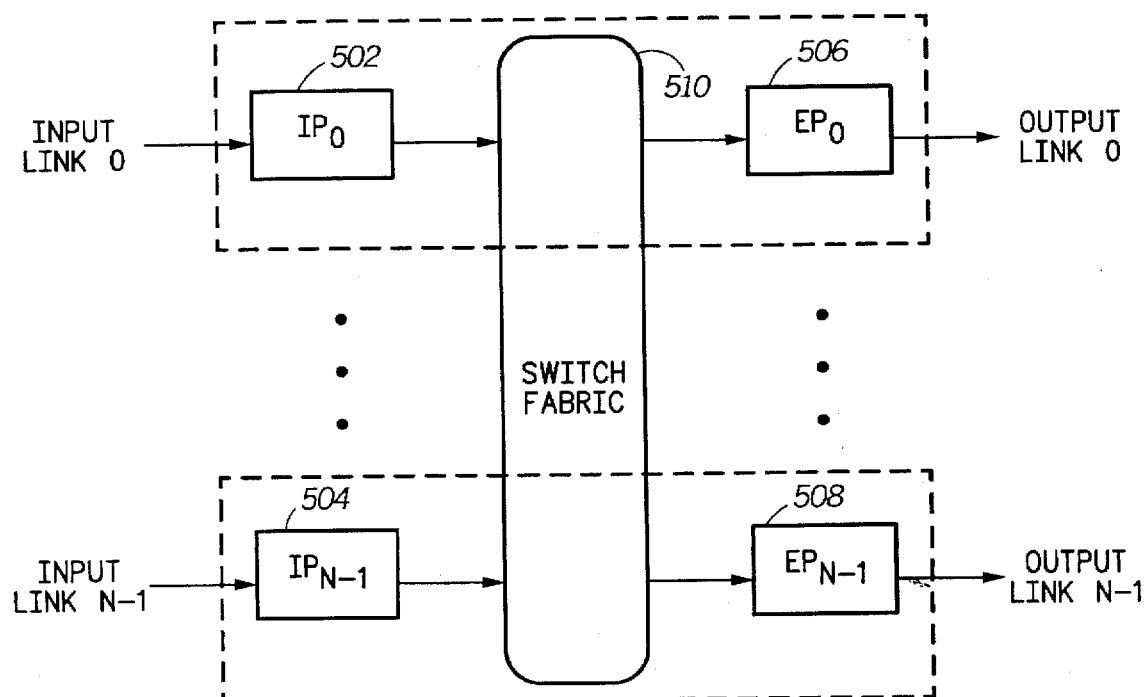
FIG. 5 is a simplified block diagram of a typical packet switch, consisting of ingress and egress processing blocks connected by a switch fabric.
Figure 2:
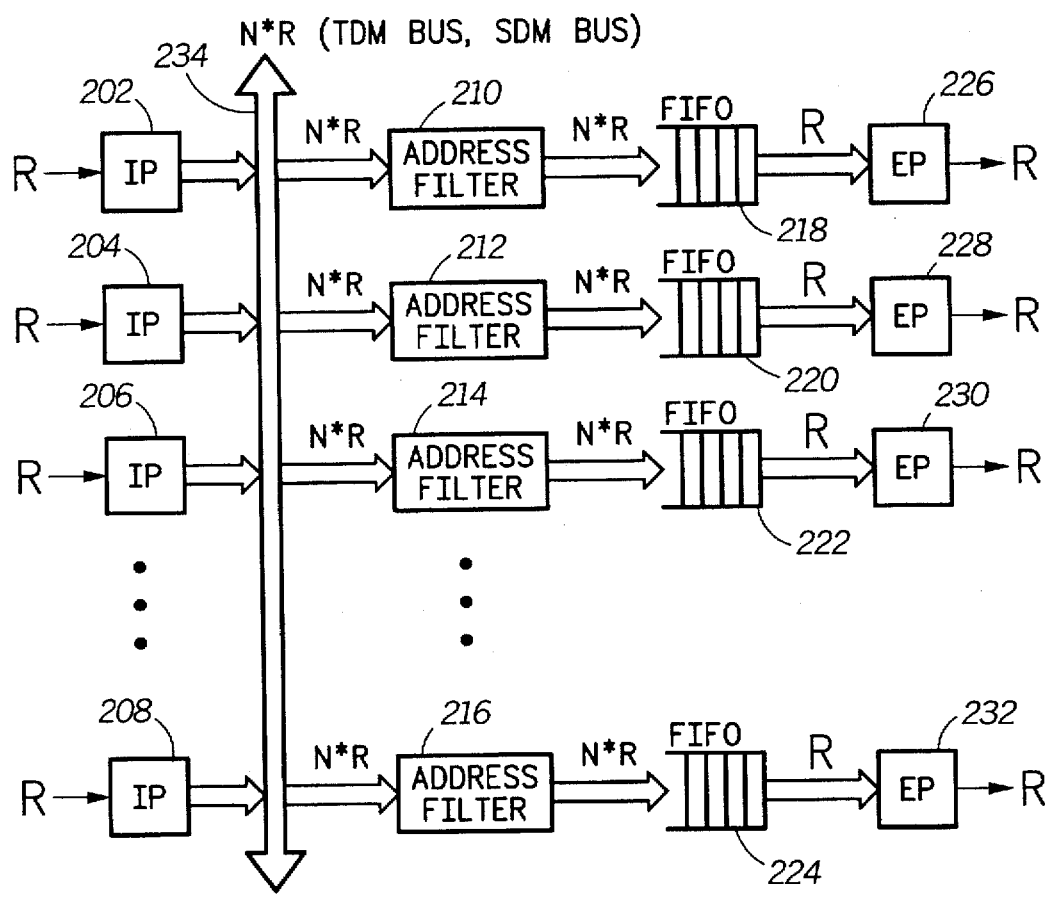
FIG. 2 is a block diagram of a device having packet flows in a typical output-queued switch architecture as is known in the art.
Figure 3:
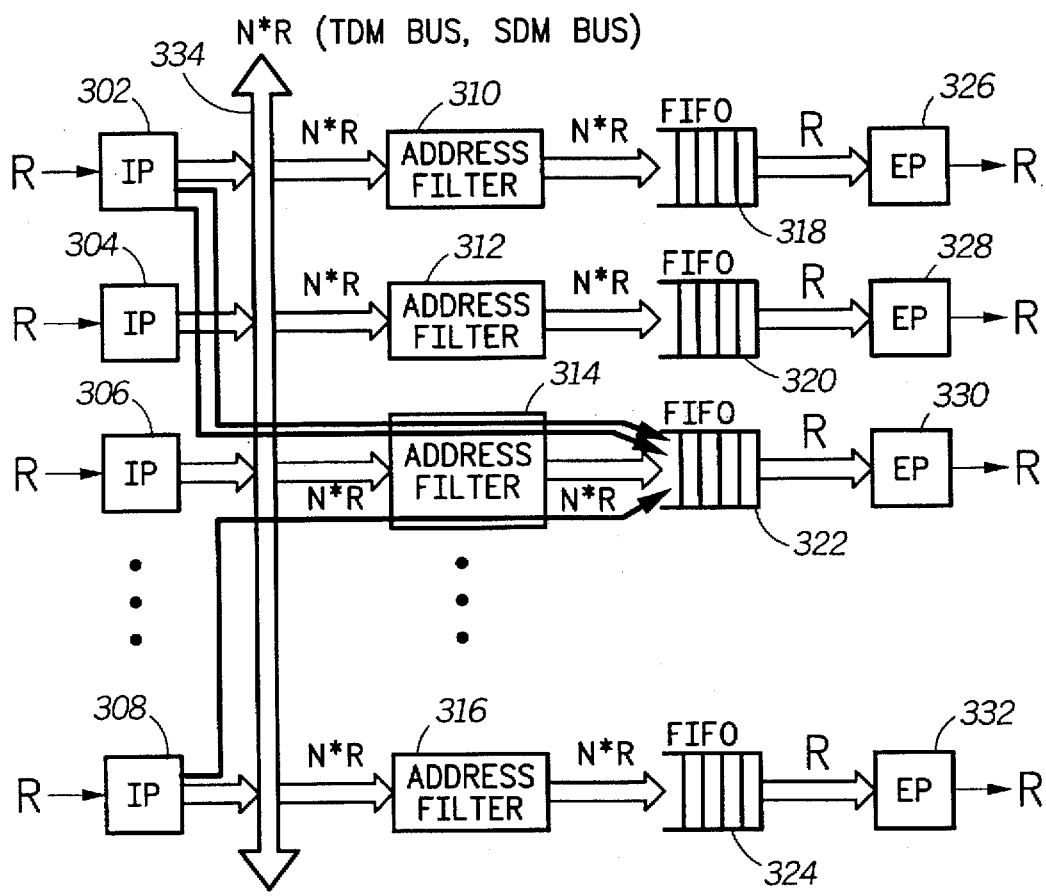
FIG. 3 shows a block diagram of a device wherein multiple packets directed to the same EP in the switch architecture of FIG. 2.
Figure 4:
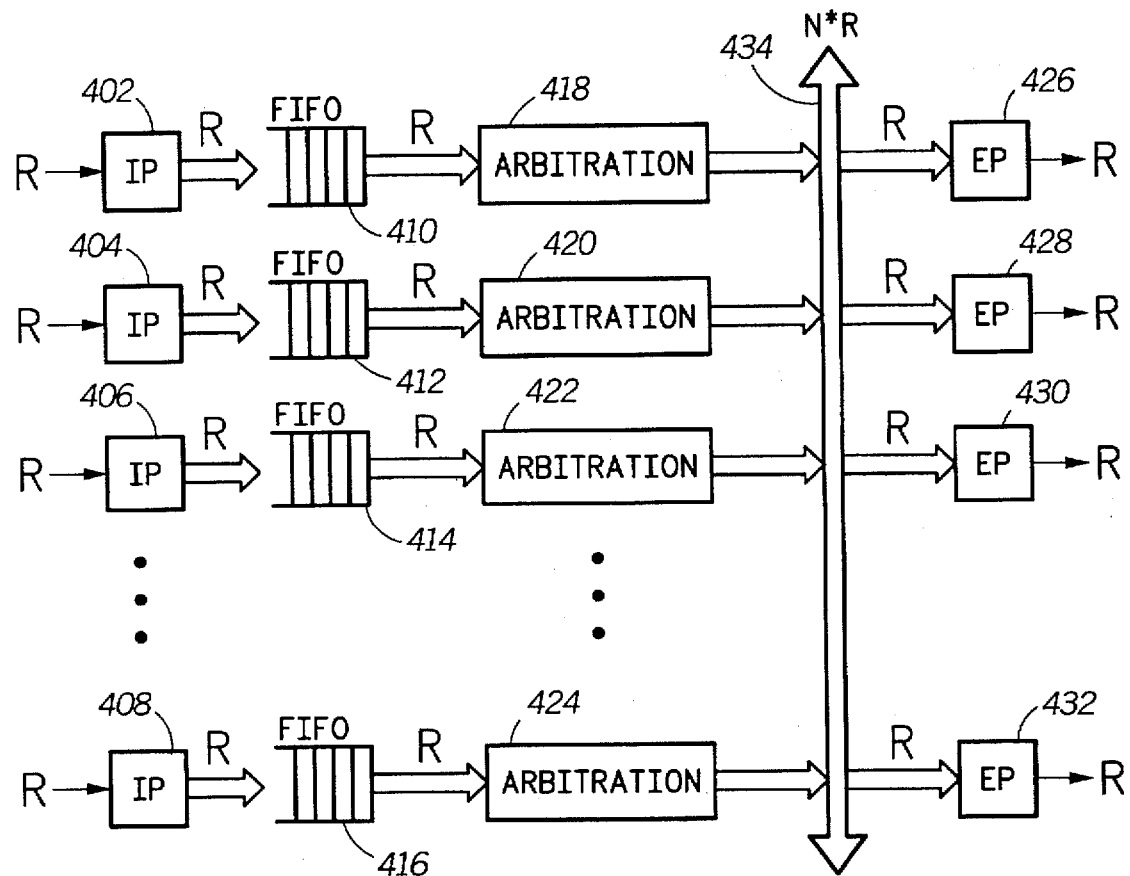
FIG. 4 is a block diagram representation of an input-queued switch architecture as is known in the art.

The operation of transferring a packet from input to output in an output-request packet switch without multipoint operation is described more fully in an application being filed simultaneously with the present application, EFFICIENT OUTPUT-REQUEST PACKET SWITCH AND METHOD, by Craig Holt et al., which is hereby incorporated by reference.

In one embodiment of the multipoint operation of the present invention, shown in FIG. 6, numeral 600, a switch accommodates "multipoint packets", i.e., packets with multiple destinations, by the following steps: A) determining (602), by a receiving IP, destination EPs for a packet that was received on an input link in accordance with a first predetermined scheme, generating an arrival tag for a primary destination EP, placing, by the IP, a SECONDARIES label in the packet, wherein the SECONDARIES label specifies "secondary destinations", i.e., EPs other than the primary destination that are destinations for the packet, and storing the packet in packet memory; B) sending (604), by the receiving IP, to the primary destination EP, an arrival tag containing the address where the packet is stored; C) receiving (606), by the primary destination EP, the arrival tag/tags and storing the arrival tag/tags in a tag memory connected to the primary destination EP; D) selecting (608), by the primary destination EP, a stored tag in accordance with a second predetermined scheme, and where the tag is an arrival tag, sending the selected stored tag to the packet memory where the packet is stored to request transmission of the packet associated with the arrival tag; E) receiving (610), by the packet memory, the selected arrival tag, retrieving the packet associated with the arrival tag from packet memory, and sending the packet associated with the arrival tag to the primary destination EP on a packet pathway; F) receiving, by the primary destination EP, the packet associated with the arrival tag and dispatching the packet from the primary destination EP; and monitoring (612), by each EP, the packet pathway and capturing the packet by all EPs that are specified as secondary destinations in the SECONDARIES label of the packet, wherein the packets captured in secondary destinations are termed "secondary packets"; G) storing (614), by receiving EPs at secondary destinations, the secondary packets in egress packet memory, generating a "secondary tag" corresponding to each secondary packet and storing the secondary tag in a tag memory along with arrival tags; and H) selecting (616), by a secondary destination EP, a stored tag in accordance with the second predetermined scheme, and where the tag is a secondary tag, retrieving the packet associated with the secondary tag from the egress packet memory and dispatching the secondary packet from the secondary destination EP.

Where selected, the packet memory may be a centralized shared packet memory for the whole switch.

Figure 7:
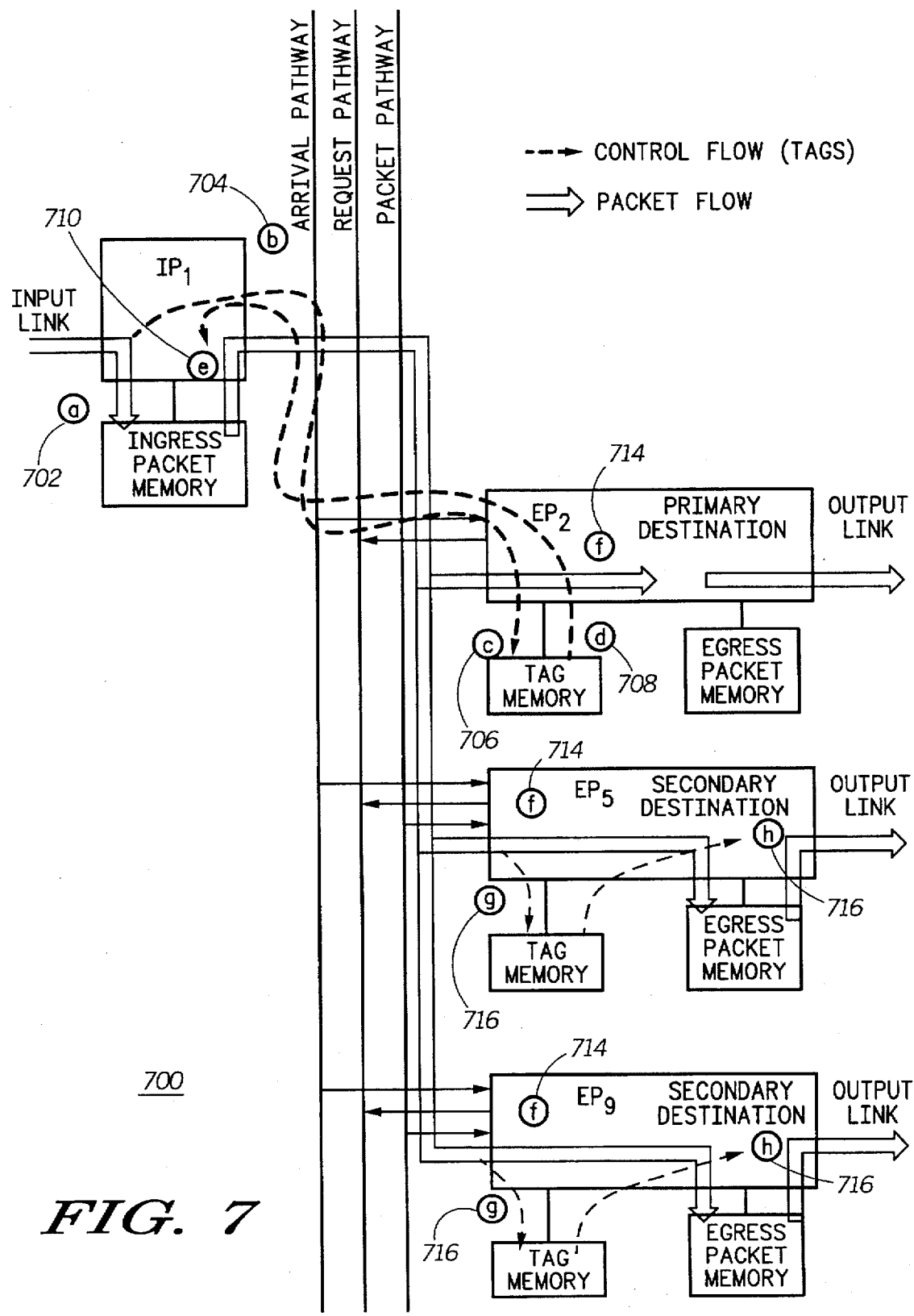
FIG. 7 is a representation of the operation of a method in accordance with the present invention.

In another embodiment of the multipoint operation of the present invention, wherein packet memory is situated at ingress ports, shown in FIG. 7, numeral 700, a switch accommodates "multipoint packets", i.e., packets with multiple destinations, by the following steps: A) determining (702), by a receiving IP, a set of destination EPs for a multipoint packet that was received on an input port in accordance with a first predetermined scheme, generating an arrival tag for a primary destination EP, labelling the multipoint packet, by the IP, with a SECONDARIES label, wherein the SECONDARIES label specifies "secondary destinations", i.e., EPs other than the primary destination that are destinations for the packet, and storing the packet in an ingress packet memory connected to the receiving IP; B) sending (704), by the receiving IP, to the primary destination EP, an arrival tag containing at least a memory location and IP number indicating where the packet is stored; C) receiving (706), by the primary destination EP, the arrival tag/tags and storing the arrival tag/tags in a tag memory connected to the primary destination EP; D) selecting (708), by the primary destination EP, a stored tag in accordance with a second predetermined scheme, and where the tag is an arrival tag, sending the selected stored tag back to the IP that sent the arrival tag; E) receiving (710), by the IP, the selected arrival tag, retrieving the packet associated with the arrival tag from ingress packet memory, and sending the packet associated with the arrival tag to the primary destination EP on a packet pathway; F) receiving, by the primary destination EP, the packet associated with the arrival tag and dispatching the packet from the primary destination EP; and monitoring (712), by each EP, the packet pathway and capturing the packet by all EPs that are specified as secondary destinations in the SECONDARIES label of the packet, wherein the packets captured in secondary destinations are termed "secondary packets"; G) storing (714), by receiving EPs at secondary destinations, the secondary packets in egress packet memory, generating a "secondary tag" corresponding to each secondary packet and storing the secondary tag in a tag memory along with arrival tags; and H) selecting (716), by a secondary destination EP, a stored tag in accordance with the second predetermined scheme, and where the tag is a secondary tag, retrieving the packet associated with the secondary tag from the egress packet memory and dispatching the secondary packet from the secondary destination EP.

In a preferred embodiment, each IP may be co-located with an EP and a common memory can be used by each IP-EP pair for the ingress packet memory and egress packet memory.

In the architecture of FIG. 7, EPs request packets from IPs, using control pathways to be described. IPs respond to requests by causing the requested packets to be read out of the associated buffer, e.g. a FIFO buffer. If the rate of packet arrivals on each input link is R, then the rate that packets can be read out of each FIFO is limited to k*R, (where k is a preselected integer less than or equal to N). If packets are requested from a given FIFO at a rate greater than k*R, excess requests are refused. A refused request is repeated until the request is accepted. Thus, this architecture reduces the cost of the buffer by reducing its transfer rate to k*R, as compared to a rate of N*R for output-queued architectures.

Another feature distinguishing the present invention from output-queued architectures is that the total packet rate of the fabric need not be N*R. Instead, the total packet rate of the switch fabric can be set to c*N*R, where c is a preselected value in the range from 0 to 1. The value c is chosen so that c*N*R is sufficient to support the average throughput requirements of the entire switch, where throughput is measured by totaling all traffic at the switch inputs. The total traffic measured at the output links can be greater than c*N*R, since multipoint packets are carried once across the switch fabric, but are delivered to multiple destination EPs at the same time.

Other advantages in common between the typical output-queued architecture and the current invention are:

1) multipoint packets do not occupy any more bandwidth on the packet bus than point-to-point packets, and
2) egress ports are not required to dispatch all the copies of a multipoint packet at the same time, but rather each egress port can sequence its packet deliveries according to the priorities of the packets directed to that egress port.

Figure 8:
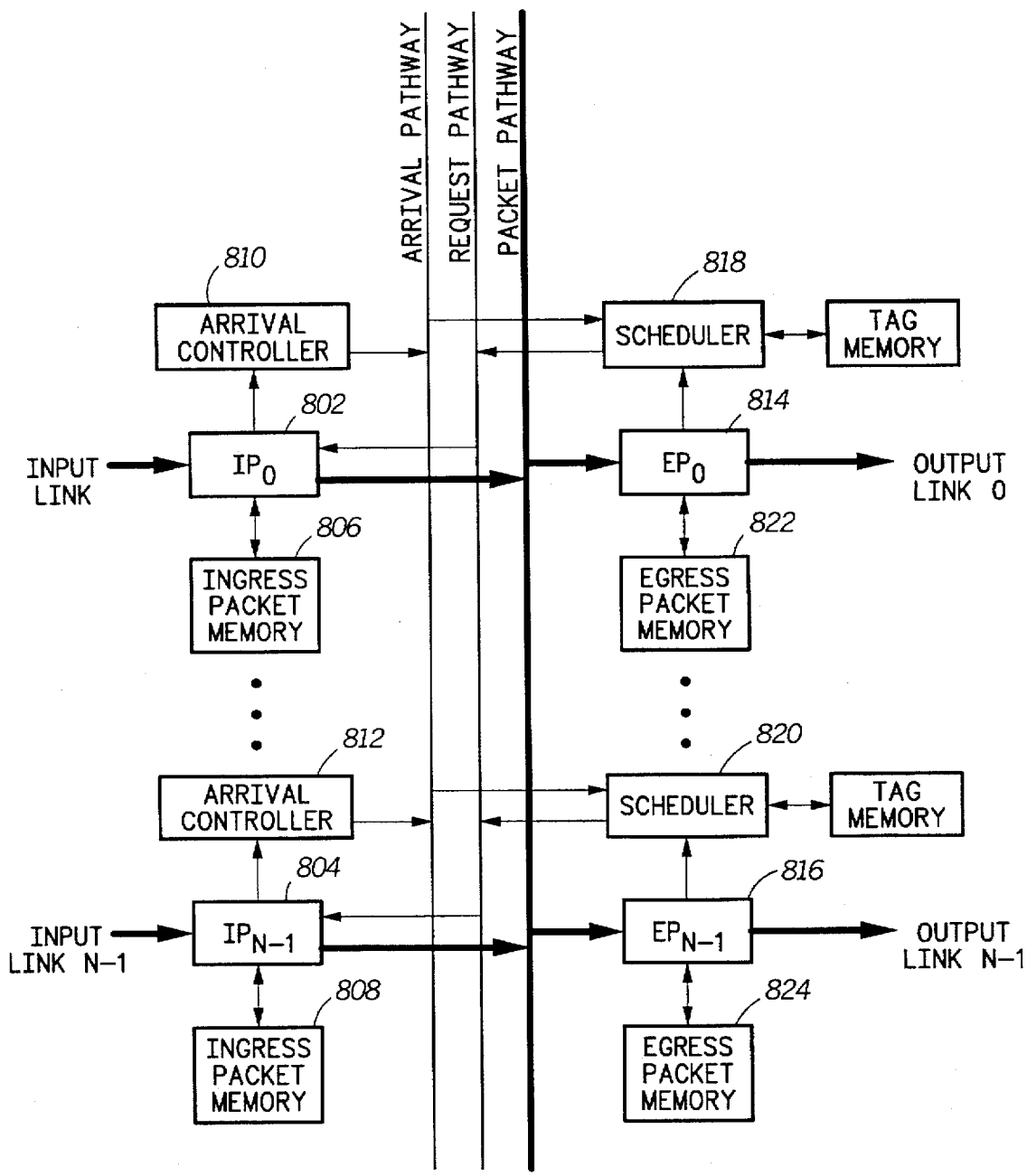
FIG. 8 is a block diagram of one embodiment of a device utilizing ingress packet memory and egress packet memory in accordance with the present invention.
Figure 9:
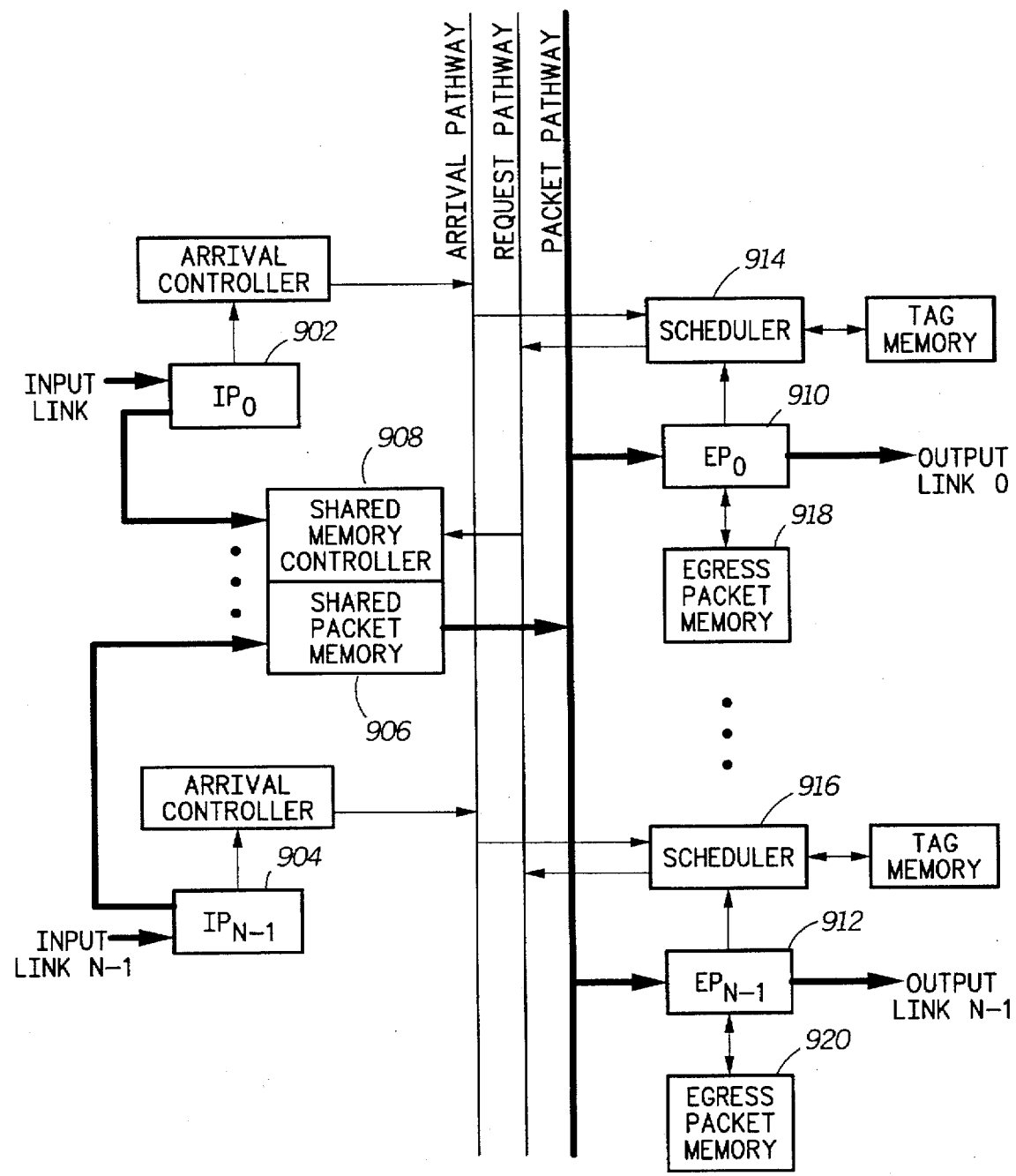
FIG. 9 is a block diagram of one embodiment of a device utilizing shared memory in accordance with the present invention.

FIG. 8, numeral 800, is a block diagram of one embodiment of a device utilizing ingress packet memory and egress packet memory in accordance with the present invention. FIG. 9, numeral 900, is a block diagram of one embodiment of a device utilizing shared memory in accordance with the present invention. The switch for implementing the method of the present invention includes: A) a plurality of ingress ports (802, . . . ,804; 902, . . . ,904), having memory (individual—806, . . . ,808; shared—906) for storing the multipoint packets and for, upon receiving a request from a scheduler of an egress port, sending the packet requested via a packet pathway; B) an arrival controller (individual—810, 812; shared—908), coupled to each ingress port, for sending an arrival tag for each packet to a first destination egress port (814, . . . ,816; 910, . . . ,912) arbitrarily selected as a primary destination for the packet, and for labelling the stored packet with a SECONDARIES label indicating the remaining destination egress ports for the packet; C) a scheduler (818, . . . , 820; 914, . . . ,916), having a scheduler memory, at each egress port, coupled to the arrival controller and to the ingress ports, for storing arrival tags and secondary tags, for selecting a stored tag in accordance with a predetermined scheme, and where the selected tag is an arrival tag, requesting the packet from the input port that sent the tag, or where the selected tag is a secondary tag, requesting the packet from the local egress packet memory; D) the egress ports (814, . . . ,816; 910, . . . ,916), each coupled to the packet pathway, for receiving the packet requested by the associated scheduler and dispatching this packet on the output link, for monitoring all packets on the packet pathway and capturing any packet that specifies the current egress port in its SECONDARIES label, wherein packets captured because of their SECONDARIES label are termed secondary packets, for storing the secondary packets in egress packet memory (822, . . . , 824; 918, . . . ,920), and for sending a secondary tag to the associated scheduler for each secondary packet.

As shown in FIG. 10, numeral 1000, multiple physical links per IP and EP may be utilized. Upon setting up a multipoint connection from a preselected input physical link to preselected set of output physical links of a switch, a multipoint identifier, MID (1002), may be assigned to the multipoint connection that is unique for each multipoint connection in the entire switch. Each EP includes a multipoint table (1004) that lists the MIDs for the multipoint connections that go through the EP, and for each MID lists a set of destination physical egress ports of the EP for the multipoint connection. When an IP labels each packet with a SECONDARIES word, the IP also labels each incoming multipoint packet with the MID of the multipoint connection. When an EP receives a secondary packet, the EP uses the MID label of the packet to look up, in the multipoint table, (1006) the set of physical egress ports of the EP which are destinations for the packet, generates a multipoint tag for each destination of the secondary packet, and stores (1008) the packet and a reference count that indicates a number of physical egress ports of the EP which are destinations for the packet. When the EP retrieves the secondary packet from a packet memory of the EP, the EP decrements the reference count for the packet and deletes the packet from the packet memory when the reference count equals zero.

The efficient packet switch of the present invention may be synchronized into cell cycles by means of a centrally generated clock (CELLCLK) signal by a clock generator, where a cell cycle is a period of time during which no more than one packet arrives at each IP of a plurality of IPs. In a switch that is synchronized into cell cycles, each IP generates no more than one arrival tag per cell cycle, and each EP of a plurality of EPs generates no more than one request per cell cycle and dispatches no more than one packet per cell cycle For a switch that is synchronized in cell cycles, in one implementation in accordance with the present invention, an arbitration method is provided that, for each cell cycle, limits the number of requests accepted per IP to a predetermined integer k, limits the total number of requests accepted by all IPs to a predetermined integer M, and limits the total number of multipoint packets accepted by all IPs to a predetermined integer P, while providing fairness among requesting EPs and two levels of request priority.

In the arbitration scheme of the present invention, fairness in arbitration is provided through use of a "group" bit scheme, which operates as follows. A group is initially empty. The first time that a set of requests is made and one or more is rejected, the rejected requests form a group. New requests in subsequent cell cycles are not allowed to enter an existing group. In each cell cycle, requests in the group are accepted in preference to other new requests. When all requests of a first group have been accepted, and where a new set of EPs is waiting with rejected requests, the new set of requests forms a new group. Thus, groups are serviced in a first-in-first-out manner. Service order within a group is typically accomplished in a numerical order according to an egress port number.

To provide two priority levels for requests, the group scheme is modified to include a high priority group and a low priority group. The low priority group is only serviced after al high priority requests have been considered.

The arbitration scheme is "distributed", meaning that it is performed by functionality associated with each IP and EP, rather than by a central arbitration control unit.

The following describes the operation of the arbitration scheme of the current invention.

"Precedence" is herein defined as a value assigned to each request by a requesting egress port. Precedence includes a priority bit (typically a leftmost bit), a group bit for a current priority (typically the bit to the right of the priority bit), and a switch port number of an egress port making the request.

In the arbitration scheme, two pathways are used: an ARBREQUEST pathway from each EP to all IPs and the other EPs, and a reject pathway from all IPs to all EPs.

Figure 11:
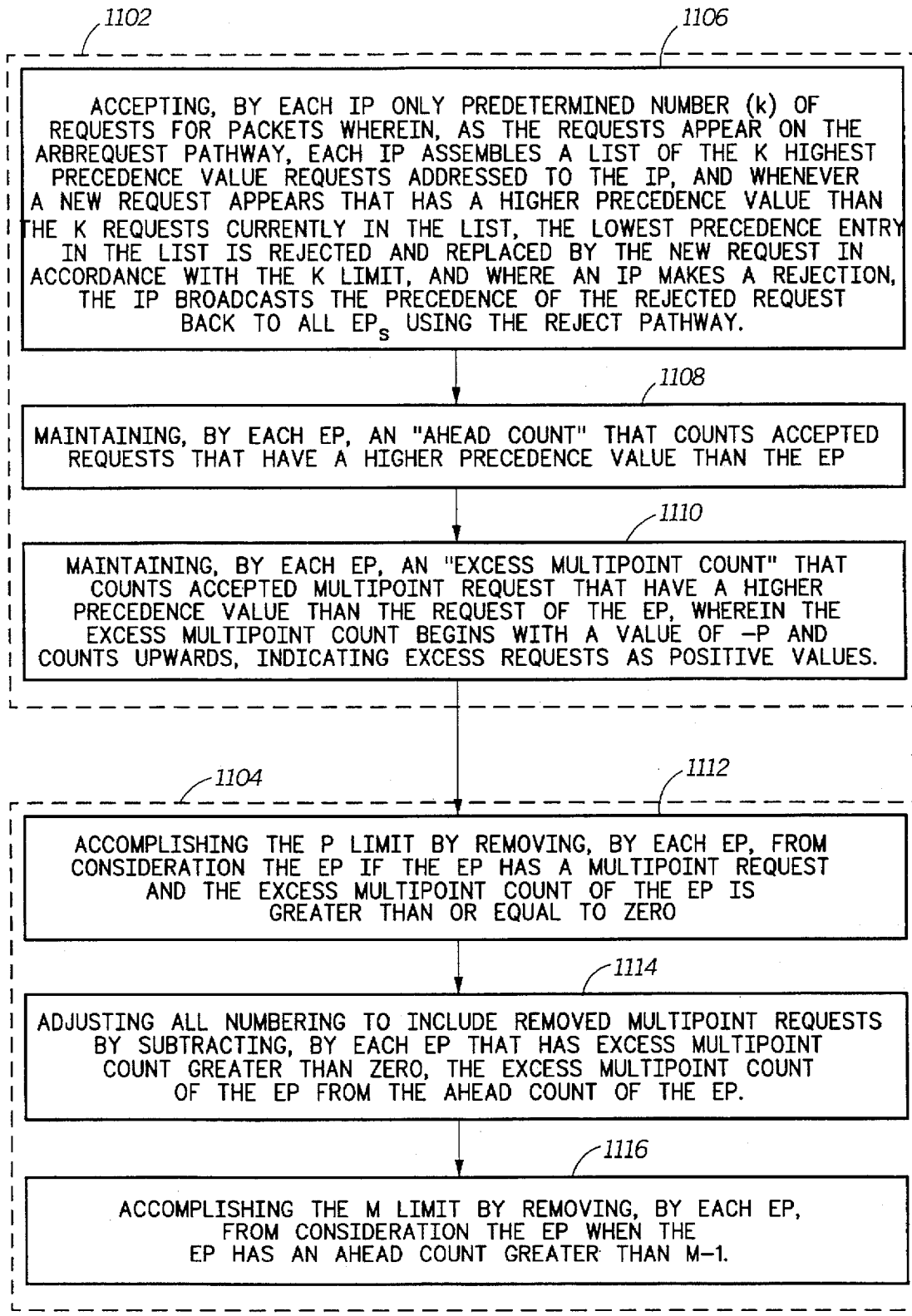
FIG. 11 is a flow chart of steps of one embodiment of a method for arbitration in a multipoint switch in accordance with the present invention.

FIG. 11 is a flow chart of steps of one embodiment of a method for arbitration in a multipoint switch in accordance with the present invention. The arbitration method includes two phases: 1) a Request Phase (1102), during which: each EP in turn places a request on the ARBREQUEST pathway, IPs may specify certain requests that are being rejected on the reject pathway, and EPs receive the rejections; and 2) a Decision Phase (1104), during which each EP uses information gathered in the Request Phase to make a final decision as to whether the EP's request is accepted or rejected. Generally a period for implementing the Decision Phase is much shorter than the period for implementing the Request Phase.

During the Request phase, the arbitration scheme further includes: A) accepting (1106), by each IP, only a predetermined number (k) of requests for packets wherein, as the requests appear on the ARBREQUEST pathway, each IP assembles a list of the k highest precedence value requests addressed to the IP, and whenever a new request appears that has a higher precedence value than the k requests currently in the list, the lowest precedence entry in the list is rejected and replaced by the new request in accordance with the k limit, and where an IP makes a rejection, the IP broadcasts the precedence of the rejected request back to all EPs using the Reject Pathway; B) maintaining (1108), by each EP, an "ahead count" that counts accepted requests that have a higher precedence value than the EP; and C) maintaining (1110), by each EP, an "excess multipoint count" that counts accepted multipoint requests that have a higher precedence value than the request of the EP, wherein the excess multipoint count begins with a value of −P and counts upwards, indicating excess requests as positive values.

During the decision phase, the arbitration scheme includes: A) accomplishing (1112) the P limit by removing, by each EP, from consideration the EP if the EP has a multipoint request and the excess multipoint count of the EP is greater than or equal to zero; B) adjusting (1114) all numbering to include removed multipoint requests by subtracting, by each EP that has excess multipoint count greater than zero, the excess multipoint count of the EP from the ahead count of the EP; and C) accomplishing (1116) the M limit by removing, by each EP, from consideration the EP when the EP has an ahead count greater than M−1.

We claim:

1. A method for switching of multipoint packets in an output request packet switch, the multipoint packets being switched from a plurality ingress ports (IPs) of to a plurality of egress ports (EPs) where at least one packet is to be delivered to at least two destination egress ports, comprising the steps of:

A) determining, by a receiving IP, a set of destination EPs for a packet that was received on an input link in accordance with a first predetermined scheme, generating an arrival tag for a primary destination EP, placing, by the IP, a SECONDARIES label in the packet, wherein the SECONDARIES label specifies "secondary destinations" and storing the packet in packet memory;

B) sending, by the receiving IP, to the primary destination EP, an arrival tag containing the address where the packet is stored;

C) receiving, by the primary destination EP, the arrival tag/tags and storing the arrival tag/tags in a tag memory connected to the primary destination EP;

D) selecting, by the primary destination EP, a stored tag in accordance with a second predetermined scheme, and where the tag is an arrival tag, sending the selected stored tag to the packet memory where the packet is stored to request transmission of the packet associated with the arrival tag;

E) receiving, by the packet memory, the selected arrival tag, retrieving the packet associated with the arrival tag from packet memory, and sending the packet associated with the arrival tag to the primary destination EP on a packet pathway;

F) receiving, by the primary destination EP, the packet associated with the arrival tag and dispatching the packet from the primary destination EP; and monitoring, by each EP, the packet pathway and capturing the packet by all EPs that are specified as secondary destinations in the SECONDARIES label of the packet, wherein the packets captured in secondary destinations are termed "secondary packets";

G) storing, by receiving EPs at secondary destinations, the secondary packets in egress packet memory, generating a "secondary tag" corresponding to each secondary packet and storing the secondary tag in a tag memory along with arrival tags; and H) selecting, by a secondary destination EP, a stored tag in accordance with the second predetermined scheme, and where the tag is a secondary tag, retrieving the packet associated with the secondary tag from the egress packet memory and dispatching the secondary packet from the secondary destination EP.

2. The method of claim 1 wherein a centralized shared memory is used for storing packets in step 1A and retrieving packets in step 1E.

3. A method for switching of multipoint packets in an output request packet switch, the multipoint packets being switched from a plurality of ingress ports (IPs) to a plurality of egress ports (EPs) where at least one packet is to be delivered to at least two destination egress ports, comprising the steps of:

A) determining, by a receiving IP, a set of destination EPs for a multipoint packet that was received on an input port in accordance with a first predetermined scheme, generating an arrival tag for a primary destination EP, labelling the multipoint packet, by the IP, with a SECONDARIES label, wherein the SECONDARIES label specifies "secondary destinations" and storing the packet in an ingress packet memory connected to the receiving IP;

B) sending, by the receiving IP, to the primary destination EP, an arrival tag containing at least a memory location and IP number indicating where the packet is stored;

C) receiving, by the primary destination EP, the arrival tag/tags and storing the arrival tag/tags in a tag memory connected to the primary destination EP;

D) selecting, by the primary destination EP, a stored tag in accordance with a second predetermined scheme, and where the tag is an arrival tag, sending the selected stored tag back to the IP that sent the arrival tag;

E) receiving, by the IP, the selected arrival tag, retrieving the packet associated with the arrival tag from ingress packet memory, and sending the packet associated with the arrival tag to the primary destination EP on a packet pathway;

F) receiving, by the primary destination EP, the packet associated with the arrival tag and dispatching the packet from the primary destination EP; and monitoring, by each EP, the packet pathway and capturing the packet by all EPs that are specified as secondary destinations in the SECONDARIES label of the packet, wherein the packets captured in secondary destinations are termed "secondary packets";

G) storing, by receiving EPs at secondary destinations, the secondary packets in egress packet memory, generating a "secondary tag" corresponding to each secondary packet and storing the secondary tag in a tag memory along with arrival tags; and H) selecting, by a secondary destination EP, a stored tag in accordance with the second predetermined scheme, and where the tag is a secondary tag, retrieving the secondary packet associated with the secondary tag from the egress packet memory and dispatching the secondary packet from the secondary destination EP.

4. The method of claim 3 wherein each ingress port is co-located with an egress port and each ingress port and associated egress port share a memory that is used for storing packets in step 1A and retrieving packets in step 1E.

5. A device for switching of multipoint packets in an output request packet switch, the multipoint packets being switched from a plurality of ingress ports (IPs) to a plurality of egress ports (EPs) where at least one packet is to be delivered to at least two destination egress ports, comprising:

A) a plurality of ingress ports, each having an associated memory for storing the multipoint packets and for, upon receiving a request from a scheduler of an egress port, sending the packet requested via a packet pathway;

B) an individual arrival controller coupled to each ingress port, for sending an arrival tag for each packet to a first destination egress port arbitrarily selected as a primary destination for the packet, and for labelling the stored packet with a SECONDARIES label indicating the remaining destination egress ports for the packet;

C) a scheduler, having a scheduler memory, at each egress port, coupled to the arrival controller and to the ingress ports, for storing arrival tags and secondary tags, for selecting a stored tag in accordance with a predetermined scheme, and one of:

C1) where the selected tag is an arrival tag, requesting the packet from the input port that sent the tag, and C2) where the selected tag is a secondary tag, requesting the packet from the local egress packet memory;

D) the egress ports, each coupled to the packet pathway, for receiving the packet requested by the associated scheduler and dispatching this packet on the output link, for monitoring all packets on the packet pathway and capturing any packet that specifies the current egress port in its SECONDARIES label, wherein packets captured because of their SECONDARIES label are termed secondary packets, for storing the secondary packets in egress packet memory, and for sending a secondary tag to the associated scheduler for each secondary packet.

6. The device of claim 5 wherein multiple physical links per IP and EP are utilized.

7. The device of claim 5 wherein, where the switch is synchronized in cell cycles, an arbitration scheme is provided that, for each cell cycle, limits the number of requests accepted per IP to a predetermined integer k, limits the total number of requests accepted by all IPs to a predetermined integer M, and limits the total number of multipoint packets accepted by all IPs to a predetermined integer P, while providing fairness among requesting EPs and two levels of request priority.

8. The device of claim 7 wherein, in the predetermined arbitration scheme, fairness is provided by using a "group" bit scheme that includes: where a group is initially empty and EPs that take part in an arbitration and are rejected form a group, approving all members of the group before any non-group requesters; and, when all members of a first group have been approved, a new set of EPs that is waiting with requests, if any, forms a new group of requesters.

9. The device of claim 8 wherein the group bit scheme is further modified to include a high-priority group and a low-priority group and the low-priority group is only utilized after all high-priority requests have been considered.

10. The device of claim 8 wherein a "precedence" value is assigned to each request by the requesting egress port and a "precedence" value is formed by concatenating:

A) one request priority bit;

B) one group bit for the current request priority; and

C) a switch port number of the egress port making the request, where a request priority is a high-order bit.

11. The device of claim 7 wherein the arbitration process includes two phases:

A) a request phase during which each EP places its request on the ARBREQUEST pathway bus, IPs may specify certain requests that are being rejected on the Reject pathway, and EPs monitor the rejections; and B) a decision phase during which each EP uses information gathered in the request phase to make a final decision as to whether its request is approved or rejected.

12. The device of claim 11 including, during the request phase, the predetermined arbitration scheme further includes: A) accepting, by each IP, only a predetermined number (k) of requests for packets wherein, as the requests appear on the ARBREQUEST pathway, each IP assembles a list of the k highest precedence value requests addressed to the IP, and whenever a new request appears that has a higher precedence value than the k requests currently in the list, the lowest precedence entry in the list is rejected and replaced by the new request in accordance with the k limit and where an IP makes a rejection, the IP broadcasts the precedence of the rejected request back to all EPs using the Reject Pathway; B) monitoring, by each EP, an "ahead count" that counts accepted requests that have a higher precedence value than the EP; and C) monitoring, by each EP, an "excess multipoint count" that counts accepted multipoint requests that have a higher precedence value than the EP wherein the excess multipoint count begins at −P and counts upwards, indicating excess requests as positive values.

13. The device of claim 12 wherein, during the decision phase, the predetermined arbitration scheme includes:
- A) accomplishing the P limit by removing, by each EP, from consideration the EP if the EP has a multipoint request and the excess multipoint count of the EP is greater than or equal to zero;
- B) adjusting all numbering to include removed multipoint requests by subtracting, by each EP that has excess multipoint counts greater than zero, the excess multipoint counts of the EP from the ahead counts of the EP; and
- C) accomplishing the M limit by removing, by each EP, to from consideration the EP when the EP has an ahead count greater than M−1.

14. A device for switching of multipoint packets in an output request packet switch, the multipoint packets being switched from a plurality of ingress ports (IPs) to a plurality of egress ports (EPs) where at least one packet is to be delivered to at least two destination egress ports, comprising:
- A) a plurality of ingress ports having a shared memory, for storing the multipoint packets and for, upon receiving a request from a scheduler of an egress port, sending the packet requested via a packet pathway;
- B) an arrival controller coupled to each ingress port, for sending an arrival tag for each packet to a first destination egress port arbitrarily selected as a primary destination for the packet, and for labelling the stored packet with a SECONDARIES label indicating the remaining destination egress ports for the packet;
- C) a scheduler, having a scheduler memory, at each egress port, coupled to the arrival controller and to the ingress ports, for storing arrival tags and secondary tags, for selecting a stored tag in accordance with a predetermined scheme, and one of:
  - C1) where the selected tag is an arrival tag, requesting the packet from the shared memory; and
  - C2) where the selected tag is a secondary tag, requesting the packet from the local egress packet memory;
- D) the egress ports, each coupled to the packet pathway, for receiving the packet requested by the associated scheduler and dispatching this packet on the output link, for monitoring all packets on the packet pathway and capturing any packet that specifies the current egress port in its SECONDARIES label, wherein packets captured because of their SECONDARIES label are termed secondary packets, for storing the secondary packets in egress packet memory, and for sending a secondary tag to the associated scheduler for each secondary packet.

15. The device of claim 14 wherein multiple physical links per IP and EP are utilized.

16. The device of claim 14 wherein, where the switch is synchronized in cell cycles, an arbitration scheme is provided that, for each cell cycle, limits the number of requests accepted per IP to a predetermined integer k, limits the total number of requests accepted by all IPs to a predetermined integer M, and limits the total number of multipoint packets accepted by all IPs to a predetermined integer P, while providing fairness among requesting EPs and two levels of request priority.

17. The device of claim 16 wherein, in the predetermined arbitration scheme, fairness is provided by using a "group" bit scheme that includes: where a group is initially empty and EPs that take part in an arbitration and are rejected form a group, approving all members of the group before any non-group requesters; and, when all members of a first group have been approved, a new set of EPs that is waiting with requests, if any, forms a new group of requesters.

18. The device of claim 17 wherein the group bit scheme is further modified to include a high-priority group and a low-priority group and the low-priority group is only utilized after all high-priority requests have been considered.

19. The device of claim 17 wherein a "precedence" value is assigned to each request by the requesting egress port and a "precedence" value is formed by concatenating:
- A) one request priority bit;
- B) one group bit for the current request priority; and
- C) a switch port number of the egress port making the request, where a request priority is a high-order bit.

20. The device of claim 16 wherein the arbitration process includes two phases:
- A) a request phase during which each EP places its request on the ARBREQUEST pathway bus, IPs may specify certain requests that are being rejected on the Reject pathway, and EPs monitor the rejections; and
- B) a decision phase during which each EP uses information gathered in the request phase to make a final decision as to whether its request is approved or rejected.

21. The device of claim 20 including, during the request phase, the predetermined arbitration scheme further includes:
- A) accepting, by each IP, only a predetermined number (k) of requests for packets wherein, as the requests appear on the ARBREQUEST pathway, each IP assembles a list of the k highest precedence value requests addressed to the IP, and whenever a new request appears that has a higher precedence value than the k requests currently in the list, the lowest precedence entry in the list is rejected and replaced by the new request in accordance with the k limit and where an IP makes a rejection, the IP broadcasts the precedence of the rejected request back to all EPs using the Reject Pathway;
- B) monitoring, by each EP, an "ahead count" that counts accepted requests that have a higher precedence value than the EP; and
- C) monitoring, by each EP, an "excess multipoint count" that counts accepted multipoint requests that have a higher precedence value than the EP wherein the excess multipoint count begins at −P and counts upwards, indicating excess requests as positive values.

22. The device of claim 20 wherein, during the decision phase, the predetermined arbitration scheme includes:
- A) accomplishing the P limit by removing, by each EP, from consideration the EP if the EP has a multipoint request and the excess multipoint count of the EP is greater than or equal to zero;
- B) adjusting all numbering to include removed multipoint requests by subtracting, by each EP that has excess multipoint counts greater than zero, the excess multipoint counts of the EP from the ahead counts of the EP; and
- C) accomplishing the M limit by removing, by each EP, from consideration the EP when the EP has an ahead count greater than M−1.

* * * * *